March 7, 1950  T. J. WRONKOWSKI  2,499,555
VEHICLE HEAD LAMP ATTACHMENT
Filed Oct. 24, 1947
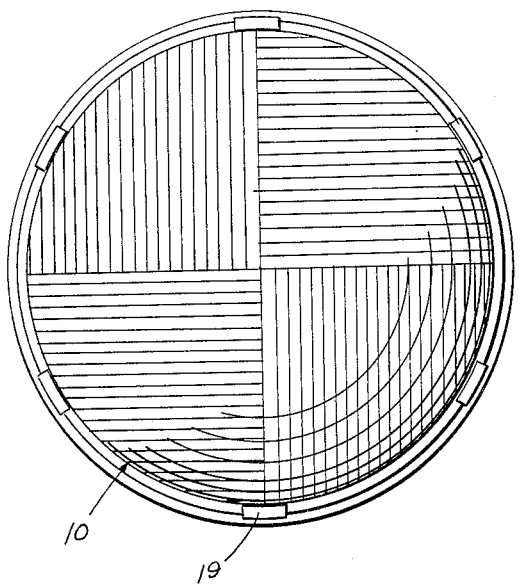
FIG. 1.
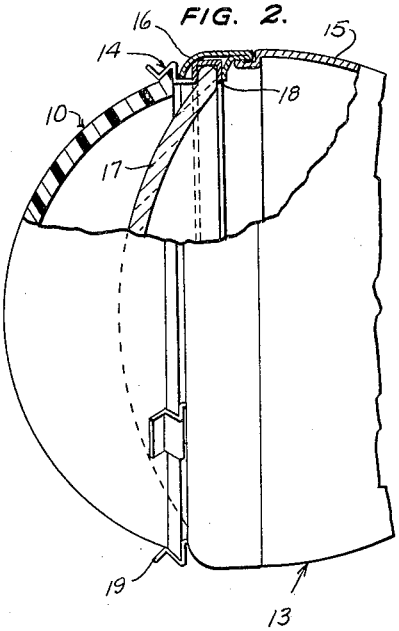
FIG. 2.
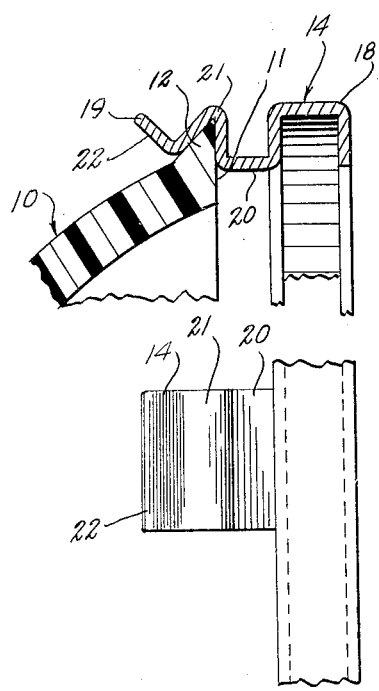
FIG. 3.
FIG. 4.
INVENTOR.
THADDEUS J. WRONKOWSKI,
BY
McMorrow, Berman + Davidson
ATTORNEYS.

Patented Mar. 7, 1950

2,499,555

UNITED STATES PATENT OFFICE 2,499,555

VEHICLE HEAD LAMP ATTACHMENT

Thaddeus J. Wronkowski, Central Falls, R. I.

Application October 24, 1947, Serial No. 781,838

1 Claim. (Cl. 240—46.59)

This invention relates to improvements in vehicle head lamps and more particularly to an attachment for use in fog and other adverse weather conditions to filter the light from the head lamps and improve the illumination effected thereby.

It is among the objects of the invention to provide an improved auxiliary head lamp lens shaped and colored to filter the light from a vehicle head lamp, and improved means for detachably securing such an auxiliary lens to a conventional head lamp so that it can be quickly applied when needed and quickly and easily removed when its use is no longer required, which auxiliary lens and attaching means is simple, durable and economical in construction, and may be formed of inexpensive materials, which lens is light in weight, substantially unbreakable and can be conveniently stored when not in use, and which attaching means can be left permanently in place on a head lamp without causing any inconvenience or adversely affecting the appearance of the head lamp.

Other objects and advantages will become apparent from a consideration of the following description in conjunction with the accompanying drawing wherein:

Figure 1 is a front elevation of an auxiliary headlamp lens and attaching means therefor, illustrative of the invention.

Figure 2 is a side elevation of a fragmentary portion of a vehicle head lamp with an auxiliary lens and attaching means illustrative of the invention applied thereto, a portion being broken away and shown in cross-section to better illustrate the construction thereof.

Figure 3 is a detailed cross-section on an enlarged scale of a fragmentary portion of the auxiliary lens and attaching means illustrated in Figure 2, and, Figure 4 is a top plan view of a fragmentary portion of the auxiliary lens attaching means.

With continued reference to the drawing, the auxiliary lens, generally indicated at 10, may have a partly spherical shape, as illustrated, so that it will fit over various types of conventional head lamp lenses and is provided with a substantially flat rear face 11 and a tapered bead 12 providing a sharply bevelled annular edge around the base of the lens. The lens may be formed of any suitable material, such as glass, but is preferably formed of a substantially unbreakable material, such as a suitable synthetic resin plastic, and is suitably colored to filter the light from a head lamp and produce a light which provides effective illumination under adverse weather conditions such as of fog and snow. A yellow or amber colored lens or filter has been found to be particularly suitable for this purpose. The surface of the lens may also be ridged or otherwise shaped to provide light diffusion or diffraction as may be desired.

The lens 10 is secured to the headlamp, generally indicated at 13 in Figure 2, by a suitable resilient lens holder, generally indicated at 14.

The head lamp has an open ended casing or body 15, the open end of which is surrounded by a bezel 16 which receives the annular edge portion of the conventional head lamp lens 17 to secure the lens 17 in operative position in the head lamps. The holder 14 comprises an auxiliary bezel 18 of channel or U-shaped cross-section which is of a size to closely receive the edge or bead of the lens 17 and to fit within the had lamp bezel 16, the annular auxliary bezel 18 may be interposed between the conventional head lamp lens and the conventional lens supporting bezel without requiring any modification to the head lamp construction. A number of spring arms 19 extend outwardly from one edge of the auxiliary bezel 18 and are preferably formed integrally therewith, as particularly illustrated in Figures 3 and 4. These spring arms are positioned at substantially equal annular intervals around the circumference of the auxiliary bezel 18, six such arms being illustrated in Figure 1. Each arm 19 comprises a substantially straight stem portion 20 projecting outwardly substantially at right angles from one side of the auxiliary bezel 18 in a position to extend forwardly of the head lamp 13 when the lens holder 14 is mounted in operative position, a recess portion 21 of V-shaped cross-section at the outer end of the stem 20, and a forwardly and outwardly inclined tongue 22 extending from the forward side of the recess portion 21.

With this arrangement, when it is desired to mount the auxiliary lens 10 in the holder 14 the bead 12 of the auxiliary lens is pressed against the tongues 22 of the arms 19 to force these arms outwardly and admit the bevelled bead 12 of the auxiliary lens into the recess portions 21 of the arms. The bead of the auxiliary lens is firmly seated in the recess portions of the arms, as clearly illustrated in Figure 3, so that the auxiliary lens is firmly attached to operative position covering the conventional head lamp lens 17. The holder 14 is formed of a relatively thin, resilient material so that the arms 19 can be sprung outwardly to receive the lens and will spring back into holding engagement with the lens as soon as the bead of the lens enters the recess portions of the arms. When it is desired to withdraw the lens, the base portion of the auxiliary lens is engaged by the fingers and the lens is pulled outwardly, the arms 19 swinging outwardly to release the auxiliary lens. The auxiliary lens may thus be quickly and easily attached and removed as may be found desirable.

The holder 14 is preferably formed of a corrosion resisting material and, since the annular bezel portion 18 is concealed within the conventional head light bezel 16 and the projecting arms 19 are relatively small and extend only a short distance in front of the head lamp, the holder can be left permanently in place without causing any damage or inconvenience or detracting from the appearance of the head lamps.

The invention may be embodied in other specific forms without departing from the spirit or essential characteristics thereof. The present embodiment is therefore to be considered in all respects as illustrative and not restrictive, the scope of the invention being indicated by the appended claim rather than by the foregoing description, and all changes which come within the meaning and range of equivalency of the claim are therefore intended to be embraced therein.

I claim:

An auxiliary head lamp lens and lens holder combination comprising an annular auxiliary bezel including a circular portion of channel-shaped cross-section for engaging the rim of a conventional head lamp lens within the conventional head lamp bezel and a plurality of resilient arms extending forwardly from said circular portion to be disposed ahead of said head lamp, each of said arms comprising a straight stem portion projecting from said circular portion, an angular portion directed outwardly of said circular portion to provide a recess at the outer end of said stem and an outwardly inclined tongue at the side of said angular portion opposite said stem, and a lens comprising a hollow, partly spherical body having an outwardly-projecting annular bead having a beveled side to seat in the recesses of said arms.

THADDEUS J. WRONKOWSKI.

REFERENCES CITED

The following references are of record in the file of this patent:

UNITED STATES PATENTS

| Number | Name | Date |
|---|---|---|
| 1,346,708 | Hein | July 13, 1920 |
| 1,856,073 | Graham | May 3, 1932 |
| 2,437,522 | Handler | Mar. 9, 1948 |